United States Patent [19]
Thompson

[11] Patent Number: 5,875,222
[45] Date of Patent: Feb. 23, 1999

[54] NUCLEAR REACTOR CORE FLOODING BY CONTROL OF SHROUD LEAKAGE AND FUEL CHANNEL SPILLOVER

[75] Inventor: Jeffrey L. Thompson, San Jose, Calif.

[73] Assignee: General Electric Company, Schenectady, N.Y.

[21] Appl. No.: 613,665

[22] Filed: Mar. 11, 1996

[51] Int. Cl.⁶ .................................................. G21C 15/02
[52] U.S. Cl. .......................................... 376/281; 376/352
[58] Field of Search ................................. 376/203, 277, 376/281, 282, 352, 443, 444

[56] References Cited

U.S. PATENT DOCUMENTS

| | | | |
|---|---|---|---|
| 4,716,011 | 12/1987 | Taleyarkhan | 376/281 |
| 5,167,911 | 12/1992 | Fujimura et al. | 376/443 |

FOREIGN PATENT DOCUMENTS

| | | | |
|---|---|---|---|
| 60177293 | 9/1985 | Japan | 376/281 |
| 6049874 | 11/1985 | Japan | 376/352 |

*Primary Examiner*—Daniel D. Wasil
*Attorney, Agent, or Firm*—Nixon & Vanderhye

[57] ABSTRACT

The bypass opening of the tie plate of a fuel assembly of a nuclear reactor is provided with a flow restricting or check valve such that flow during normal operation upwardly through the tie plate and bypass opening is maintained. In the event of a loss of coolant accident, and degradation of a core spray sparger system, backflow leakage through the tie plate is minimized or eliminated by the valves, enabling the core spray sparger system to flood the core about the fuel assemblies and provide spillover coolant into the open top ends of the fuel assemblies. Additionally, because the fuel assemblies change in length over time, a uniform coolant flow distribution into the fuel assemblies upon loss of coolant accident is achieved by providing metering holes through the channels whereby each channel receives substantially the same flow of coolant from the flooded core.

3 Claims, 3 Drawing Sheets

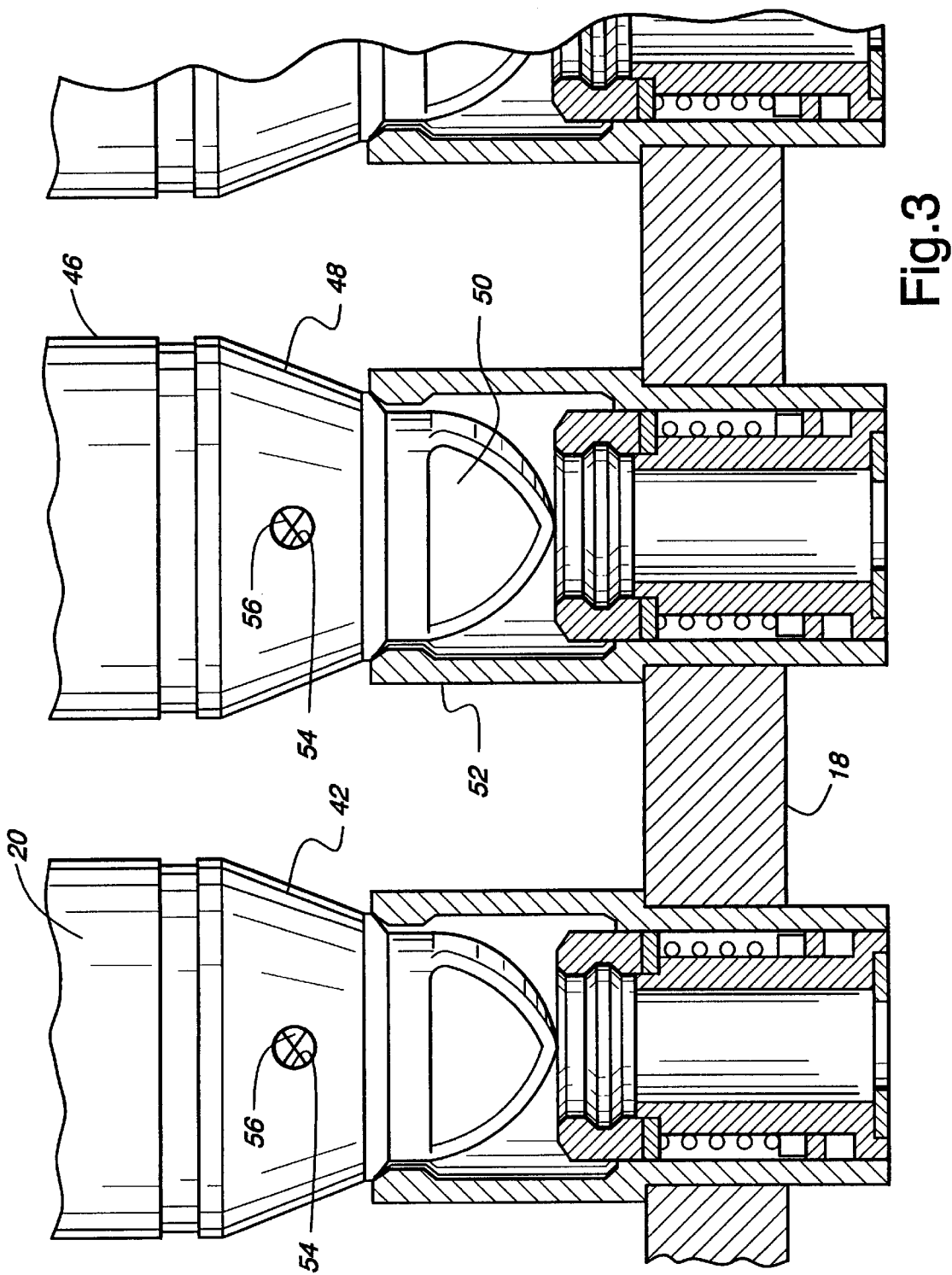

NUCLEAR REACTOR CORE FLOODING BY CONTROL OF SHROUD LEAKAGE AND FUEL CHANNEL SPILLOVER

TECHNICAL FIELD

The present invention relates to a system for flooding a nuclear reactor core in the event the coolant level in the core drops below a level which may cause fuel damage and particularly relates to a system for controlling leakage through the core plate to enable flooding of the shroud to the top of the active fuel using a core spray sparger and controlling spillover into the fuel assembly channels.

BACKGROUND

In a typical boiling water nuclear reactor, a reactor core includes a core plate supporting a plurality of fuel assemblies within a core shroud. The core shroud provides a barrier to separate upward coolant flow through the core from the downward flow in an annulus surrounding the core within the reactor vessel. The fuel assemblies each comprise a plurality of fuel rods carried on a lower tie plate and supported within a fuel channel. The lower tie plate is received in an opening through the core plate and has an inlet at its lower end for flowing coolant upwardly through the core plate and tie plate into and about the fuel rods within the fuel channel. A bypass flow through the tie plate is also provided for flowing coolant between the channels. Consequently, there is generally an upward flow of coolant from below the reactor core through the tie plate and into and about the fuel assemblies during normal operation of the reactor.

In the event of a drop of coolant level below the top of the active fuel assemblies, or a major loss of coolant in the event of a large recirculation line break that drains the annulus, a core spray sparging system is used to distribute coolant to each fuel assembly to prevent fuel damage. That is, the core spray sparging system prevents fuel rod cladding damage in the event the core becomes uncovered due to loss of coolant. The sparging system includes nozzles mounted in a sparger ring located inside the reactor vessel above the fuel assemblies for directing coolant as a spray over the area of the fuel assemblies. The core spray system also includes pumps, valving, piping and instrumentation necessary to provide coolant to the reactor.

Core spray sparging systems, however, may degrade and break down, resulting in a loss of ability to provide uniform coolant flow across the core. While core spray spargers can be serviced during refueling operations and parts replaced, there is considerable expense involved. Consequently, in the event of a drop of coolant level, for example, due to a recirculation line break, the core spray sparger system may not have the remaining capacity due to degradation or breakdown to achieve a minimum coolant flow to each fuel channel and prevent fuel cladding damage. This is a result of the inability of the core spray spargers when degraded or broken down to provide distribution of sufficient coolant to make up for the flow of coolant out of the core due to backflow leakage through the tie plates and the core plate. For example, upon a large recirculation line break, coolant flows downwardly through the fuel channels and from between the fuel channels through various leakage paths including the lower tie plate bypass holes through the core plate. These backflow leakage paths are designed into the reactor to approximate 10% of normal operating core flow in order to maintain sub-cooling of the water between the fuel channels. That is, approximately 90% of the backflow leakage is through the lower tie plate bypass holes and finger springs mounting the channel. Stated differently, the lower tie plate holes are sized to ensure that 10% of the flow is bypassed in normal operation when flow is moving upwardly through the core plate. Following a large recirculation line break, the flow from between the channels reverses and flows through the bypass holes into the lower tie plate and through the core plate. It will be appreciated that in the event of a loss of coolant flow due to a line break, and a degraded or broken down core sparger system, the core sparger may have insufficient capability to provide adequate coolant distribution to the fuel assemblies to prevent fuel cladding damage.

DISCLOSURE OF THE INVENTION

According to the present invention, backflow leakage in the event of a loss of coolant due to a recirculation line break is controlled such that the core spray sparger system is sufficient to flood the core. Additionally, the present invention provides for control of coolant spillover into coolant fuel channels. Thus, the present invention uses leakage control and spillover control rather than spray distribution to the fuel channels to achieve fuel cooling. To accomplish this, backflow leakage following a loss of coolant accident is controlled by adding a mechanism to restrict backflow through the lower tie plate bypass holes. For example, a flapper or swing check valve, a ball check valve, fluid vortex diode or other mechanical device that allows bypass flow in one direction during normal operation of the reactor but restricts, impedes or prevents backflow through the bypass openings in the event of a loss of coolant accident assures adequate coolant flow to the core following the accident. The restriction mechanism in the bypass openings prevents or minimizes leakage flow through those openings, enabling the coolant level to rise between the fuel channels to the top of the core. Coolant flow from about the fuel channels thus spills over into the fuel channels to supply additional coolant to the fuel rods.

In operating the nuclear reactor, the nuclear characteristics cause the channels to assume various lengths over time. Because the channels shrink variably over time, the channels, for example, about the perimeter of the core and closest to the shroud tend to receive a maximum amount of the coolant from the core sparger system while those fuel channels centrally located within the core receive less. To equalize the flow of coolant, and provide uniform cooling flow for each channel, metering holes are disposed through the walls of the channel through their upper ends. The metering holes thus ensure a channel will not have an excess coolant flow and thereby deprive other channels of sufficient coolant. Metering holes are designed so that the rate of increase of coolant flow with water level increase is reduced.

As a consequence of the foregoing construction, the shroud may be flooded in the event of a loss of cooling accident, notwithstanding the degradation or breakdown of the core spray sparger system. That is, flooding of the shroud is achieved by leakage control, i.e., preventing or minimizing backflow of coolant from between the fuel channels through the flow bypass holes in the lower tie plate, thereby eliminating any need to replace the sparger system. Consequently, the present invention prevents fuel damage in the event of failure of the sparger system to provide minimum coolant flow to each fuel channel and equalizes the flow to the channel via the metering holes. This is done inexpensively by providing one-way valves or restrictors in the bypass openings of the lower tie plate and forming holes in the channel walls.

In a preferred embodiment according to the present invention, there is provided in a nuclear reactor having a plurality of fuel assemblies in a reactor core, each fuel assembly having a channel surrounding a plurality of nuclear fuel rods and a lower tie plate with an inlet for flow of coolant into the channel and at least one bypass opening for flow of coolant into the core between the channels, a method of maintaining coolant within the channels in the event the coolant level falls within the core, comprising the steps of restricting outflow of coolant through the bypass opening of each tie plate while operating a core spray system to flow coolant into the core to flood the core, enabling spillover of coolant within the core into the fuel channels.

In a further preferred embodiment according to the present invention, there is provided, in a nuclear reactor having a core containing nuclear fuel assemblies, each fuel assembly having a channel surrounding a plurality of nuclear fuel rods and a lower tie plate supported on a core plate, a method of maintaining coolant within the assemblies in the event the coolant level within the core falls below a predetermined level, comprising the steps of reducing leakage flow from the core across the core plate while operating a core spray system for flowing coolant into the core.

In a still further preferred embodiment according to the present invention, there is provided a fuel assembly for a nuclear reactor comprising a lower tie plate, a plurality of nuclear fuel rods carried by the lower tie plate, a fuel channel surrounding the fuel rods, the lower tie plate having an inlet opening for receiving coolant for flow into the channel about the fuel rods and a bypass flow passage for flowing coolant about the channel, the bypass flow passages including a valve for restricting or preventing backflow of coolant from about the channels through the bypass flow passage.

Accordingly, it is a primary object of the present invention to provide a core flooding system in a nuclear reactor for flooding the core in the event of a loss of coolant accident which utilizes backflow leakage rather than excess flow to the shroud to achieve shroud flooding to the top of the active fuel and also provides uniform cooling flow to each flow channel.

BRIEF DESCRIPTION OF THE DRAWINGS

FIG. 3 is an enlarged fragmentary cross-sectional view illustrating the coupling between the lower end of the fuel assembly and the core plate.

BEST MODE FOR CARRYING OUT THE INVENTION

Figure 1:
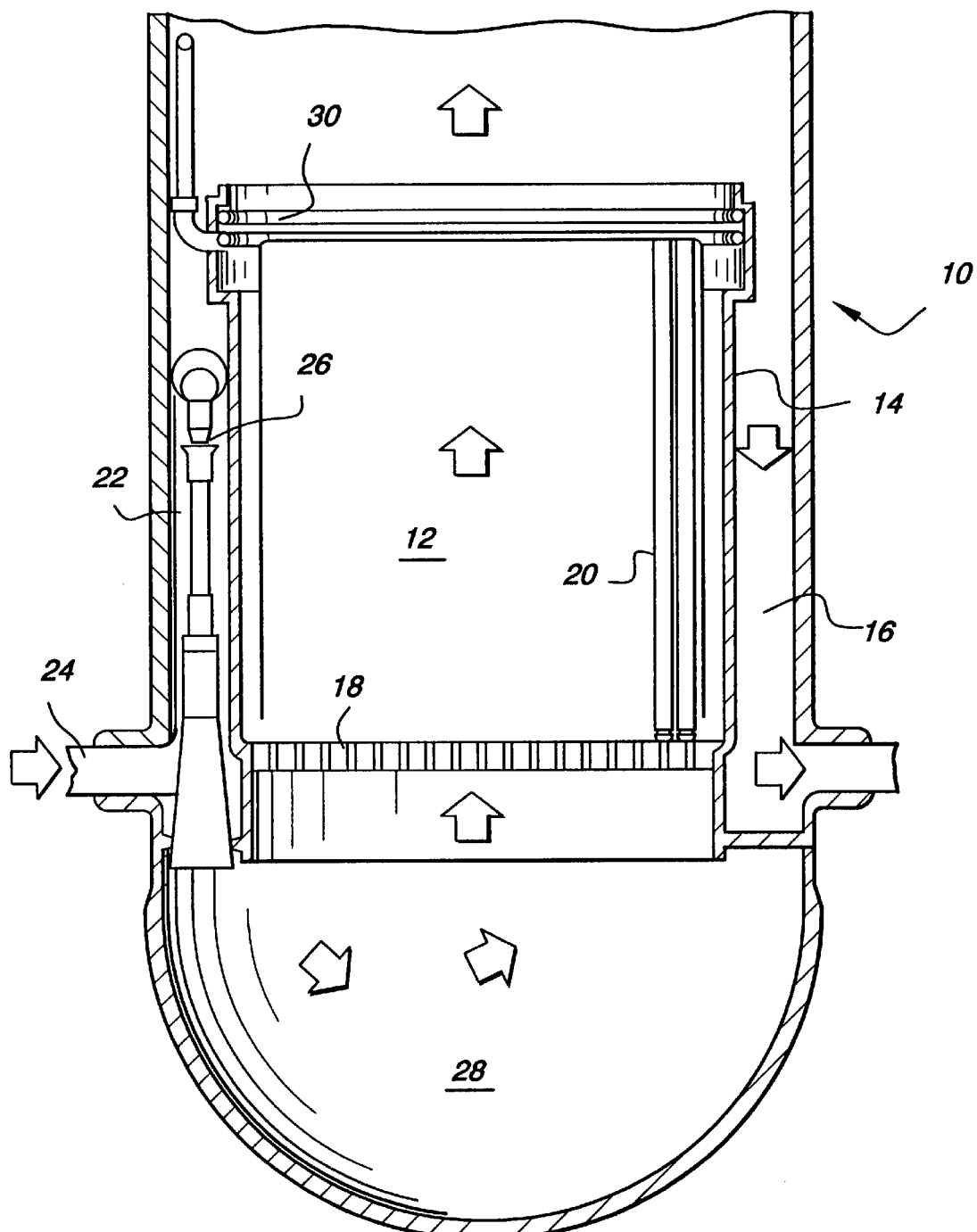
FIG. 1 is a fragmentary cross-sectional view through a nuclear reactor vessel illustrating the reactor core and the circulation of coolant.

Referring to FIG. 1, there is illustrated a reactor vessel, generally designated 10, containing a reactor core 12 including a core shroud 14 spaced from the walls of vessel 10 to define an annulus 16 therebetween and a core plate 18 for supporting a plurality of fuel assemblies 20, only two of which are illustrated. It will be appreciated that coolant circulates within the reactor vessel 10. Particularly, forced circulation through the core is provided by jet pumps 22 which receive coolant from an external recirculation pump, not shown, via conduit 24. The coolant enters the jet pump by way of a nozzle 26 into a throat which induces surrounding coolant in the downcomber region between the shroud 14 and vessel 10 to be drawn into the jet pump where the two flows mix and pass through a diffuser for discharge into the lower core plenum 28. Consequently, the coolant flows upwardly from the lower plenum 28 through the core plate 18 and into and about the fuel assemblies. The coolant passing along individual fuel rods within each fuel assembly is heated and becomes a two-phase steam/coolant mixture which enters a plenum above the core, not shown, which opens to an array of fixed steam separators and dryers where water is removed. The water collected in the dryer after leaving the separator passes downwardly in the annulus 16 for recirculation to the recirculation pump.

Also illustrated in FIG. 1 is a core sparger spray system 30 which, in the event of a loss of coolant accident, directs coolant in a spray form above the top of the fuel assemblies into the fuel assemblies. That is, the core sparging system 30 provides a jetted spray over the area of the fuel assemblies from nozzles mounted on the sparger ring located inside the reactor vessel above the fuel assemblies. It will be appreciated that various pumps, valves, piping and other instrumentation is associated with the core spray sparger system. Because the reactor vessel is a closed system, once the spray system is actuated, it continues to operate and supply coolant to the fuel assemblies. As noted above, the core spray sparger system, however, can degrade over time. Hence, the degradation of the core spray sparging system may result in loss of capacity to provide sufficient and uniform coolant flow across the core in the event of a loss of coolant accident.

Figure 2:
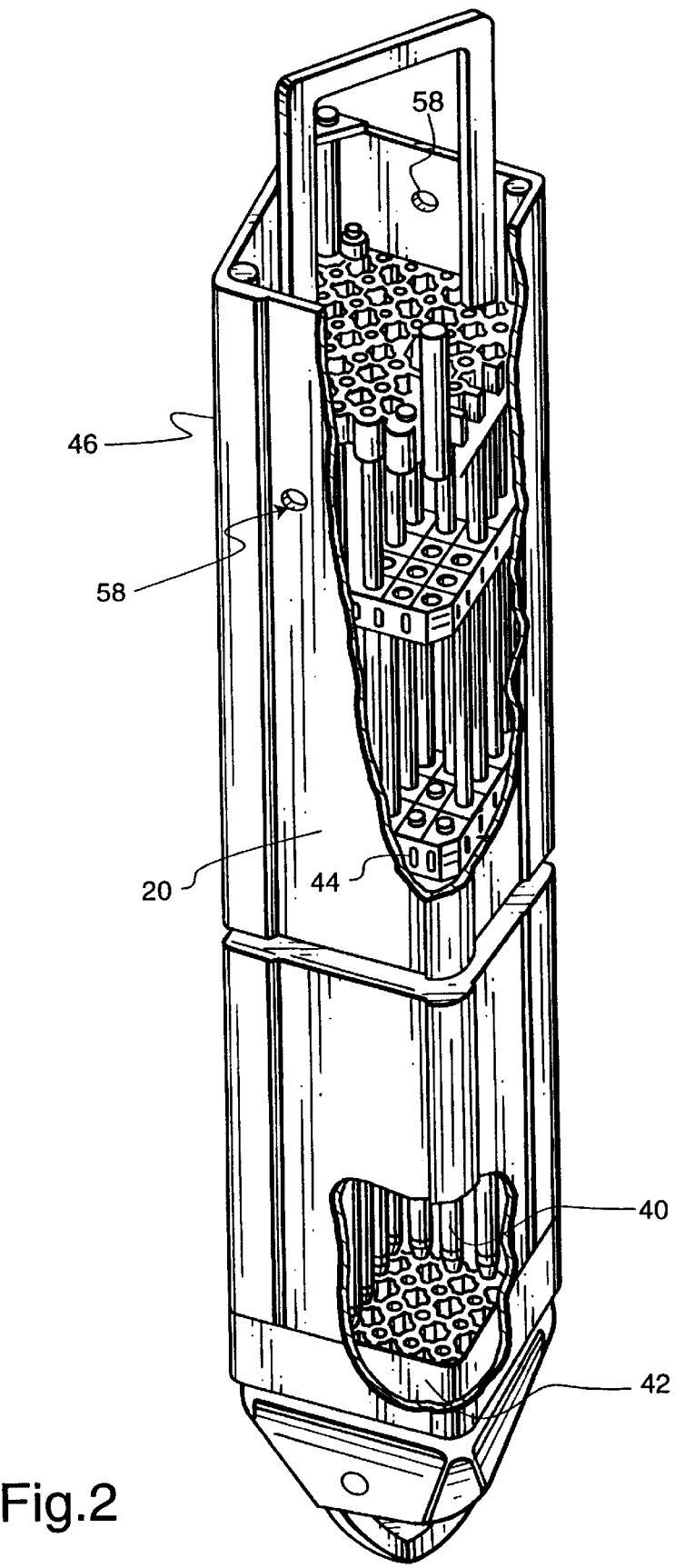
FIG. 2 is a perspective view of a fuel assembly constructed in accordance with the present invention for use in the reactor core of FIG. 1.

Referring now to FIG. 2, there is illustrated a fuel assembly 20 constructed in accordance with the present invention. It will be appreciated that fuel assembly 20 includes a plurality of nuclear fuel rods 40 disposed in essentially a rectilinear array and supported from a lower tie plate 42. The fuel rods 40 extend vertically and are maintained in lateral spaced positions by spacers 44 disposed along the height of the fuel assembly. The fuel rods and portion of the lower tie plate are encased within a fuel channel 46. The lower end of the tie plate comprises a tapered nose piece 48 having an inlet opening 50 at its bottom for receiving coolant from the lower core plenum. It will be appreciated that the fuel assembly is seated on the core plate 18 with the tie plate seated on a fuel support 52, as illustrated in FIG. 3, or on the tie plate directly. Thus, during normal operations, coolant flows upwardly into the core through the inlet in the tie plate and into each fuel channel for flow about the fuel rods. Additionally, tie plates have one or more bypass openings 54 for flowing coolant into the volume between the fuel assemblies to maintain sub-cooling between the fuel assemblies.

In accordance with the present invention, the tie plate bypass openings are controlled to eliminate or minimize and thus restrict the backflow of coolant from the core in the event of a loss of coolant accident. To accomplish this, the tie plate openings 54 are provided with a flapper or swing check valve, a ball check valve or a vortex diode or any other mechanism or device 56 that permits bypass flow upwardly into the volume between the fuel assemblies during normal operation and controls, i.e., restricts or eliminates, backflow to the extent necessary to assure adequate coolant flow to the core by the sparger system following a loss of coolant accident. A loss of coolant accident would typically lower the level of coolant within the core and may possibly cause the coolant level to lower to the point where fuel cladding damage is incurred. To avoid this, the present invention restricts or eliminates the backflow leakage through the tie plate bypass openings, enabling the core sparger system, whether degraded or having lost the ability to provide uniform coolant across the core, to enable a flooding of the core and consequent spillover of coolant into the top of the fuel assemblies. By restricting or eliminating the leakage flow, the flow into the shroud from the core sparger system exceeds the leakage flow out of the shroud by an amount greater than the minimum flow required to cool the core. Consequently, during a loss of coolant accident, the coolant flow into the core is greater than the leakage flow, enabling the core to be flooded with spillover into the fuel assemblies, thereby preventing fuel cladding damage.

A further feature of the present invention resides in providing a uniform flow of coolant into each fuel channel as a result of the loss of coolant accident. It will be appreciated that during operation, the fuel assemblies tend to shrink in length over time. While the differences in length may be small, fuel assemblies about the periphery of the core and closer to the source of coolant may be provided more coolant by the core sparger system than the fuel assemblies toward the central portion of the core. To achieve uniform flow of coolant during flooding, metering holes 58 are disposed in the channels adjacent the upper ends thereof. Consequently, notwithstanding the changes in height of the fuel assemblies over time, a substantially uniform flow distribution or spillover of coolant into all channels is achieved.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a nuclear reactor having a plurality of fuel assemblies in a reactor core, each fuel assembly having a channel surrounding a plurality of nuclear fuel rods and a lower tie plate with an inlet for flow of coolant into the channel and at least one bypass opening for flow of coolant into the core between the channels, a method of maintaining coolant within the channels in the event the coolant level falls within the core, comprising the steps of:

restricting outflow of coolant through the bypass opening of each tie plate while operating a core spray system to flow coolant into the core to flood the core, enabling spillover of coolant within the core into the fuel channels.

2. A method according to claim 1 including providing at least one metering opening adjacent a top portion of each fuel channel to substantially control the flow of coolant into each fuel channel.

3. A method according to claim 1 including substantially equalizing the coolant flow spillover into the fuel channels.

* * * * *